US009036834B2

(12) United States Patent
Fujita et al.

(10) Patent No.: US 9,036,834 B2
(45) Date of Patent: May 19, 2015

(54) AUDIO SIGNAL PROCESSING APPARATUS

(75) Inventors: Hiroaki Fujita, Hamamatsu (JP); Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 710 days.

(21) Appl. No.: 13/101,954

(22) Filed: May 5, 2011

(65) Prior Publication Data

US 2011/0274294 A1 Nov. 10, 2011

(30) Foreign Application Priority Data

May 7, 2010 (JP) ................................ 2010-107242
Sep. 27, 2010 (JP) ................................ 2010-216249

(51) Int. Cl.
*H04B 1/00* (2006.01)
*H04H 60/04* (2008.01)

(52) U.S. Cl.
CPC .................................... *H04H 60/04* (2013.01)

(58) Field of Classification Search
CPC ..................................................... H04H 60/04
USPC ........................................................ 381/119
See application file for complete search history.

(56) References Cited

U.S. PATENT DOCUMENTS

| | | | | |
|---|---|---|---|---|
| 4,879,751 | A | 11/1989 | Franks et al. | |
| 6,091,012 | A | 7/2000 | Takahashi | |
| 2007/0025568 | A1 | 2/2007 | Aiso et al. | |
| 2008/0219478 | A1* | 9/2008 | Aoki et al. | 381/119 |
| 2012/0020498 | A1 | 1/2012 | Fujita et al. | |

FOREIGN PATENT DOCUMENTS

JP 2008-227761 A 9/2008

OTHER PUBLICATIONS

Yamaha. (2002). Digital Audio Mixing System PM1D System Software V1.41, Console Surface CS1D Operation Manual, 629 pgs (submitted in six parts).

European Search Report mailed Nov. 29, 2011, for EP Patent Application No. 11164881.2, eight pages.

European Search Report mailed Dec. 5, 2011, for EP Patent Application No. 11174661.6, nine pages.

(Continued)

*Primary Examiner* — Paul S Kim
(74) *Attorney, Agent, or Firm* — Morrison & Foerster LLP

(57) ABSTRACT

An audio signal processing apparatus performs audio signal process composed of a plurality of channels each having parameters used in the audio signal process. The audio signal processing apparatus has a plurality of channel strips, each channel strip being assigned with a channel and being provided with manipulators for adjusting values of the parameters of the assigned channel. There are provided a plurality of storing sections having different priorities relative to each other, each storing section being capable of storing a setting indicative of a channel set to a channel strip for assignment thereto. A changing section changes the settings stored in the storing sections. An assigning section is activated when the setting stored in one of the plurality of the storing sections is changed by the changing section, then refers to all of the storing sections that currently store the settings for a channel strip, and assigns a channel to the channel strip according to the setting stored in a storing section having the highest priority among the storing sections referred to by the assigning section.

8 Claims, 11 Drawing Sheets

(56) References Cited

OTHER PUBLICATIONS

Non-Final Office Action mailed Dec. 11, 2013, for U.S. Appl. No. 13/188,382, filed Jul. 21, 2011, nine pages.

Notice of Allowance mailed Sep. 30, 2014, for U.S. Appl. No. 13/188,382, filed Jul. 21, 2011, eight pages.

Yamaha Corp. (2005). Digital Mixing Console M7CL, English language, 282 pages.

* cited by examiner

AUDIO SIGNAL PROCESSING APPARATUS

BACKGROUND OF THE INVENTION

1. Technical Field of the Invention

The present invention relates to an audio signal processing apparatus having functions to assign channels to manipulators provided on a manipulation panel and to set and change values of parameters of the assigned channels through manipulation of the manipulators.

2. Description of the Related Art

There is known an audio signal processing apparatus which includes a plurality of channel strips, each including manipulators such as a fader, a rotary encoder, and various buttons and assigns input channels to the channel strips and allows the user to adjust the values of various parameters of an input channel through manipulators on a channel strip corresponding to the input channel. For example, the following Non-Patent Reference 1 (see Section 4: Basic Manipulation of Input Channel) describes, on pages 32 and 33, a console of an audio mixing system in which layer data is assigned to each channel strip portion including an array of channel strips and the assigned layer data is switched to make it possible to control many channels using a limited number of channel strips. The term "layer data" refers to data defined to specify channels (assignment channels) which are to be assigned to channel strips included in a channel strip portion.

Patent Reference 1 describes a mixer that allows a user to create user layer data separately from default layer data provided by the manufacturer. That is, the mixer allows the user to specify channels (assignment channels) assigned to channel strips included in a channel strip portion to create a piece of user layer data. Channel strips, for which assignment channels are not specified but instead "current state hold" is specified, may be set in the user layer data. For example, when the layer data calling state has been switched from the calling state of first layer data to that of second layer data (which is referred to as user layer data), previous assignment channels of the first layer data are kept unchanged for each channel strip for which "current state hold" is specified in the second layer data.

[Patent Reference 1] Japanese Patent Application Publication No. 2008-227761

[Non-Patent Reference 1] DIGITAL AUDIO MIXING SYSTEM PM1D, CONSOLE SURFACE CS1D, MANIPULATION MANUAL (BASIC MANIPULATION), 2002, YAMAHA However, for example, the user desires a channel, to which vocals or the like are assigned, to be always assigned to a specific channel strip on the panel since there is a need to always monitor or frequently adjust the vocal channel. The user may also need to use other channel strips while switching assignment of various channels to the other channel strips. For example, in the case where eight channel strips 1 to 8 are provided on the manipulation panel, the user may need to adjust the vocal channel always using the channel strip 8 while switching assignment of various channels to the other channel strips.

In this case, layer data is set in one layer according to the conventional technology. That is, only current values of channels assigned to channel strips are recorded (stored) in the current memory and the current values stored in the current memory are overwritten (rewritten) with values of newly selected layer data. Thus, if layer data is switched, then assignments of all 8 channel strips are changed, causing inconvenience of use. Of course, it is possible to cope with the above need by fixing the channel strip 8 to the vocal channel, previously creating several pieces of user layer data specifying assignment of various combinations of channels to the channel strips 1 to 7, and then switching the several pieces of user layer data. Using the technology of Patent Reference 1, it is also possible to cope with the above need by initially calling layer data, which specifies assignment of the vocal channel to the channel strip 8, and then specifying the channel strip 8 as "current state hold" in user layer data that is called thereafter. However, the user has to conduct a troublesome task of previously creating a plurality of such user layer data. Specifically, it is very troublesome for the user to create user layer data while carefully watching which channel strip is used for the vocal channel. In addition, when the channel strip to which the vocal channel is assigned has been changed, the user should rewrite all user layer data that have been created up to that time.

SUMMARY OF THE INVENTION

Therefore, an object of the invention is to provide an audio signal processing apparatus that allows the user to fixedly assign a specific channel to a channel strip while keeping the fixed assignment controllable and to manipulate other channel strips while switching assignment of various channels to the other channel strips without conducting such a troublesome preliminary task.

In accordance with the invention, to achieve the above object, there is provided an audio signal processing apparatus for performing audio signal process composed of a plurality of channels each having parameters used in the audio signal process, the audio signal processing apparatus comprising: a plurality of channel strips, each channel strip being assigned with a channel and being provided with manipulators for adjusting values of the parameters of the assigned channel; a plurality of storing sections having different priorities relative to each other, each storing section being capable of storing a setting indicative of a channel set to a channel strip for assignment thereto; a changing section that changes the settings stored in the storing sections; and an assigning section that is activated when the setting stored in one of the plurality of the storing sections is changed by the changing section, then refers to all of the storing sections that currently store the settings for a channel strip, and assigns a channel to the channel strip according to the setting stored in a storing section having the highest priority among the storing sections referred to by the assigning section.

In a practical form, each of the storing sections is capable of storing the setting for a given number of channel strips, and one of the storing sections must store the setting for all of the given number of channel strips, while other storing section is allowed to store the setting for only a part of the given number of the channel strips.

In a preferred form, the plurality of channel strips include a group of channel strips, wherein one of the storing sections stores the setting indicative of channels set to the group of channel strips, and wherein other storing section stores the setting indicative of channels set to the same group of channel strips as the group involved in the setting stored in the one storing section.

Preferably, the changing section changes the setting stored in one of the storing sections and maintains the setting stored in the remaining storing section without changing the setting.

In a practical form, the plurality of the storing sections comprise a first storing section and a second storing section having a priority higher than the first storing section, the first storing section storing a first setting indicative of channels set to a group of channel strips, the second storing section storing a second setting indicative of channels set to the same group of channel strips as the group involved in the first setting. The audio signal processing apparatus further comprises a first specifying section that is capable of designating the first storing section and specifying one or more of channels to be set to the group of channel strips. The changing section changes the first setting stored in the first storing section when the same is designated by the first specifying section so as to reflect the specified channel in the changed first setting, and does not change the second setting stored in the second storing section. The assigning section precedes the second setting to the first setting so as to sort the group of channel strips into a first part composed of one or more channel strips not involved in the second setting and a second part composed of one or more channel strips involved in the second setting, such that the assigning section assigns channels to the second part of channel strips according to the second setting and assigns channels to the first part of channel strips according to the first setting.

Further, the audio signal processing apparatus comprises a second specifying section that is capable of designating the second storing section and specifying one or more of channels to be set to the group of channel strips. The changing section changes the second setting stored in the second storing section when the same is designated by the second specifying section so as to reflect the specified channel in the changed second setting, and does not change the first setting stored in the first storing section. The assigning section precedes the second setting to the first setting so as to sort the group of channel strips into a first part composed of one or more channel strips not involved in the second setting and a second part composed of one or more channel strips involved in the second setting, such that the assigning section assigns channels to the second part of channel strips according to the second setting and assigns channels to the first group of channel strips according to the first setting.

According to the invention, it is possible to fixedly assign a desired channel to a desired channel strip by the second setting while conveniently and freely changing assignment of channels to other channel strips by switching the first setting. In addition, since channel specification data is structured in two layers of the first setting and the second setting which has priority over the first setting, it is possible to easily change fixed assignment of a channel to a channel strip by changing the second setting. In this case, there is no need to rewrite the first setting.

DETAILED DESCRIPTION OF THE DRAWINGS

Embodiments of the invention will now be described with reference to the drawings.

Figure 1:
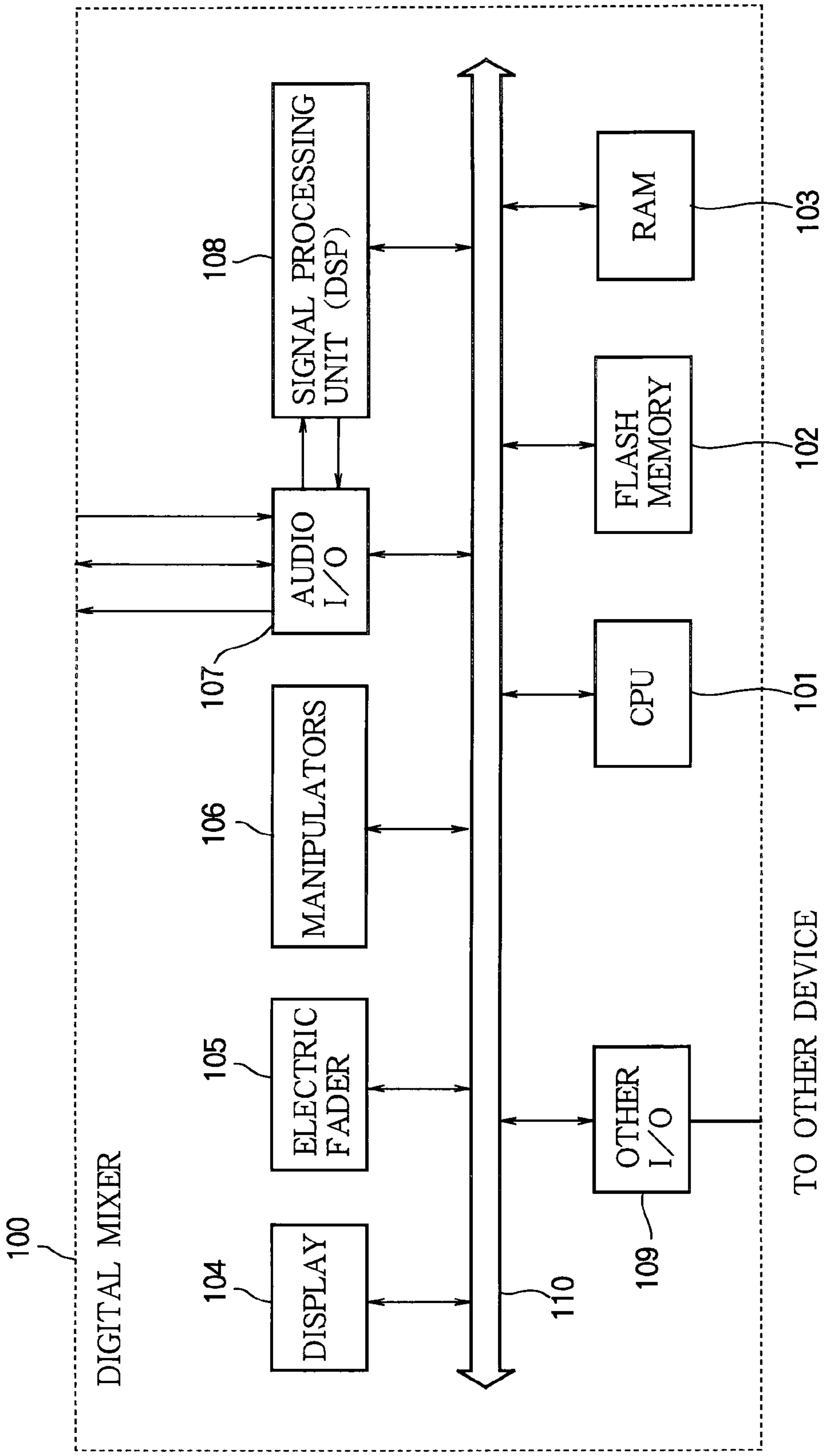
FIG. 1 illustrates a hardware configuration of a digital mixer according to a first embodiment of the invention.

FIG. 1 is a block diagram illustrating a hardware configuration of a digital mixer 100 according to a first embodiment of the invention. A Central Processing Unit (CPU) 101 is a processing device that controls the overall operation of the mixer. A flash memory 102 is a nonvolatile memory that stores various programs executed by the CPU 101, various data, and the like. A Random Access Memory (RAM) 103 is a volatile memory used as a work area or a load area of a program executed by the CPU 101. A display 104 is a touch panel display provided on a control panel of the mixer for displaying a variety of information and can detect touch manipulations. Electric faders 105 are manipulators for level setting, which are provided on the manipulation panel. The manipulators 106 are various manipulators (other than electric faders) for manipulation by the user, which are provided on the manipulation panel. An audio input/output (I/O) interface 107 is an interface for exchanging audio signals with an external device. A signal processing unit (DSP) 108 executes various microprograms based on instructions from the CPU 101 to perform a mixing process, an effect imparting process, an audio volume level control process, and the like on an audio signal received through the audio I/O interface 107 and outputs the processed audio signal through the audio I/O interface 107. Another I/O interface 109 is an interface for connection to another device. A bus 110 is a set of bus lines for connection between these components and collectively refers to a control bus, a data bus, and an address bus. In addition, the term "signal" used in this specification refers to an audio signal unless specifically stated otherwise (for example, unless stated as a control signal).

Figure 2:
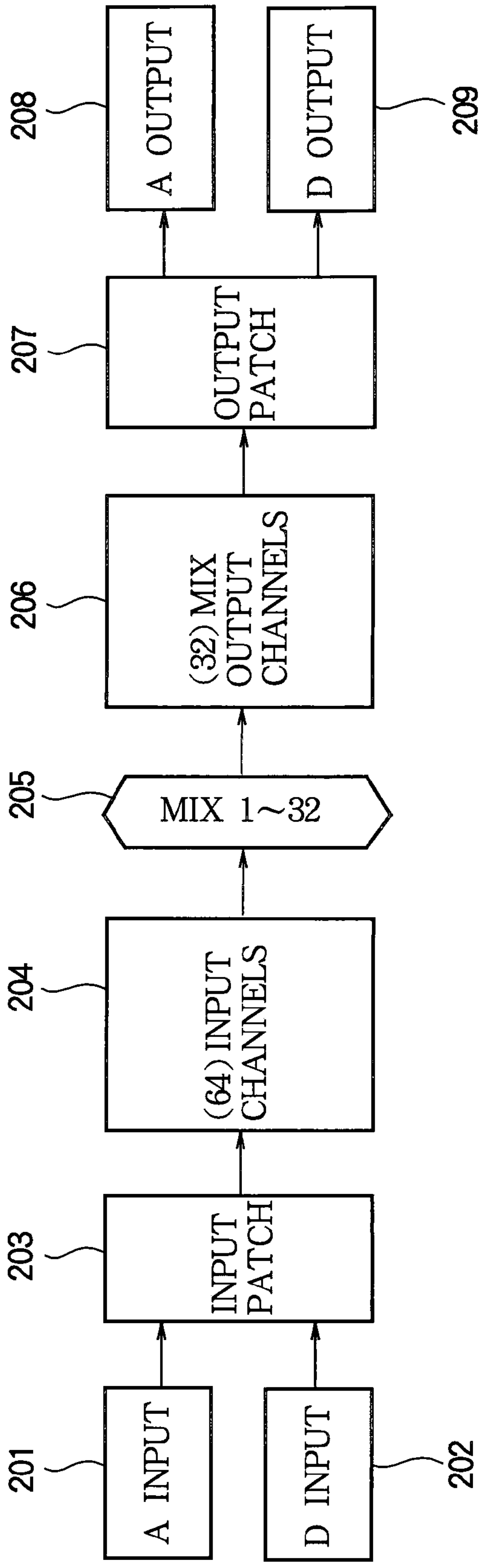
FIG. 2 is a block diagram illustrating mixing processing.

FIG. 2 is a block diagram illustrating a functional configuration of a mixing process implemented through the mixer of FIG. 1. Reference numeral "201" denotes an analog input unit for receiving and converting an analog audio signal input through a microphone or the like into a digital signal. Reference numeral "202" denotes a digital input unit for receiving a digital audio signal. Each of the input units includes a plurality of audio signal inputs, the number of which has an upper limit depending on the configuration of the mixer. An input patch 203 performs desired line connection (patching) from the inputs to input channels (CH) 204. The user may freely set such line connections while viewing a specific screen. The input channels 204 include 64 single channels. Each input channel 204 performs various signal processing, such as level control and adjustment of frequency characteristics, on an input signal based on set parameters. A signal of each input channel 204 may be selectively output to 32 mix buses 205 and the send level of each input channel 204 may be set independently of each other.

Each of the 32 mix buses 205 mixes signals input from the input channels 204. The mixed signal of each mix bus 205 is output to one of 32 output channels 206 (1st to 32nd channels) corresponding to the mix bus. The mix buses 205 have one-to-one correspondence with the output channels 206. Each output channel performs various output signal processing based on current values of set parameters. Outputs of the output channels 206 are input to an output patch 207. The output patch 207 performs desired line connection from the output channels 206 to an analog output unit 208 or a digital output unit 209. The user may freely set such line connections while viewing a specific screen.

The input units 201 and 202 and the output units 208 and 209 are implemented through the audio I/O interface 107. The DSP 108 implements other parts 203 and 207 by executing a microprogram. The CPU 101 sets the microprogram by sending the microprogram to the DSP 108. The CPU 101 also sets coefficient data used when executing the microprogram by sending the coefficient data to the DSP 108.

Each component of the mixer 100 shown in FIG. 2 has various parameters. Current values of the parameters (current data) are stored in a current memory set in the flash memory 102 or the RAM 103. Setting of signal processing of the components in the mixer 100 or setting of panel states is performed based on current data stored in the current memory. That is, the mixer 100 is designed such that operations of the components of the mixer 100 can be controlled by setting or changing values of various parameters in the current memory. Current data of all parameters associated with the mixer 100 is stored in the current memory and current data in the current memory is changed (adjusted) according to various manipulations performed using the manipulators 105 and 106 or the touch panel display 104.

Figure 3:
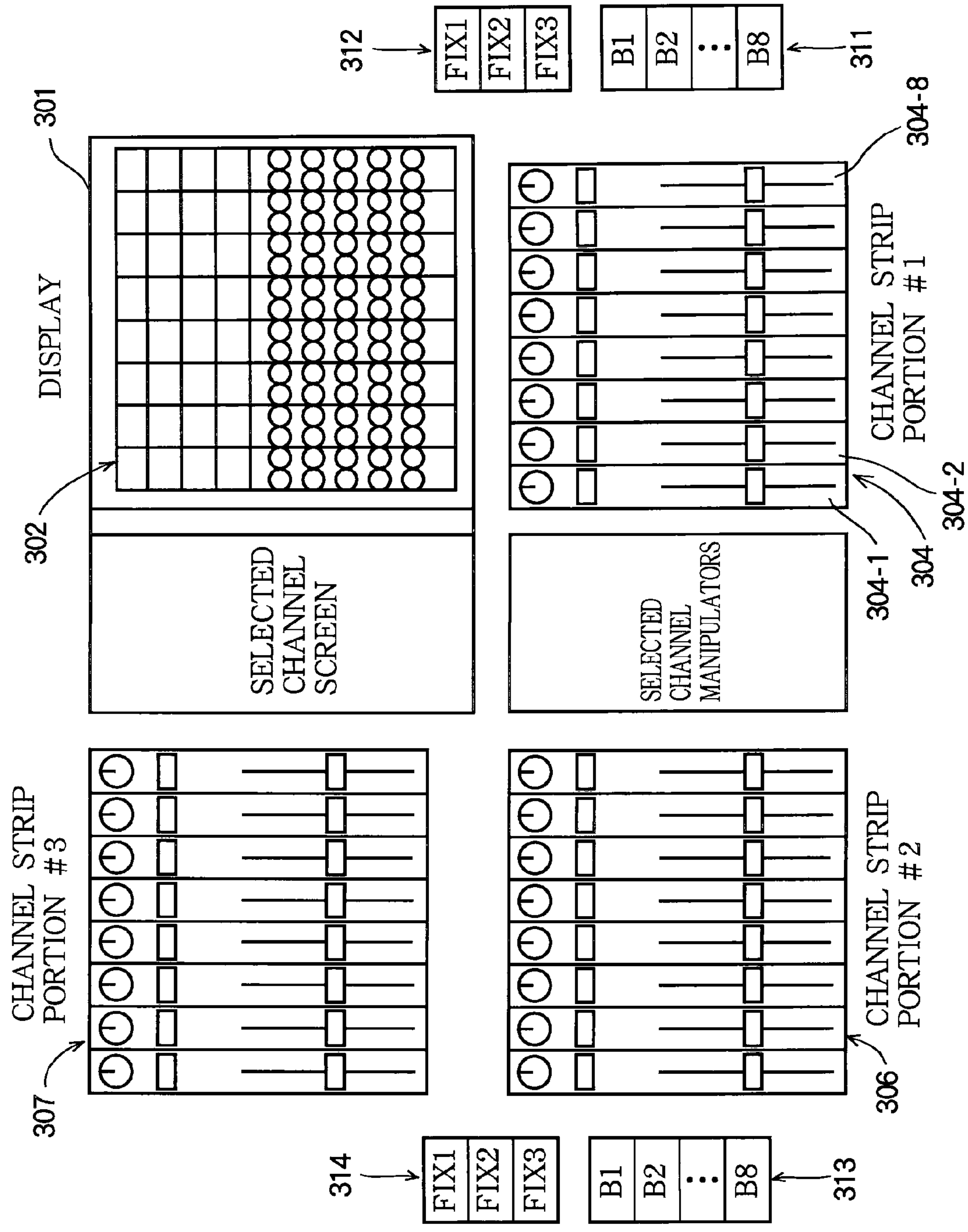
FIG. 3 illustrates an external appearance of a manipulation panel.

FIG. 3 illustrates an external appearance of (a part of) the manipulation panel of the digital mixer of this embodiment. Reference numeral "301" denotes a display (corresponding to the display 104 in FIG. 1) for displaying a variety of information. A channel strip portion 304 (corresponding to the electric faders 105 and the manipulators 106 in FIG. 1) is provided below the display 301. The channel strip portion 304 includes 8 channel strips 304-1 to 304-8. One channel strip, for example, the channel strip 304-1, includes a rotary encoder, several switches, an electric fader, and the like. Each of the channel strip portions 306 and 307 includes 8 channel strips, similar to the channel strip portion 304.

In a region 302 of the display 301 above the channel strip portion 304, display regions (referred to as "channel parameter display regions") of parameters of channels assigned respectively to the channel strips 304-1 to 304-8 of the channel strip portion 304 are arranged and displayed above the channel strips 304-1 to 304-8 at positions corresponding to the channel strips 304-1 to 304-8. The same number of channel parameter display regions (8 channel parameter display regions in this example) as the number of channel strips provided on the channel strip portion 304 are displayed in the region 302. Each channel parameter display region implements a parameter display function to display various parameters of a channel assigned to the channel parameter display region. That is, a channel assigned to each channel parameter display region corresponds to a channel assigned to a corresponding channel strip. That is, the corresponding channel strip is a channel strip that is located below the channel parameter display region. Software (or virtual) manipulators used to adjust the values of various parameters of the channel assigned to the channel parameter display region are displayed in the channel parameter display region. The channel parameter display region implements a function to adjust various parameters of the channel through direct touch manipulation of the corresponding software manipulators or through manipulation of corresponding manipulators after the software manipulators are touched to be selected. The manipulators for adjusting the values of the parameters indicate both hardware (or physical) manipulators (such as electric faders, rotary encoders, and switches) physically provided on the channel strip portion 304 and various software manipulators in the channel parameter display regions in the region 302. Upon detection of a manipulation of an adjustment manipulator, the value of a parameter (the corresponding value of current data in the current memory), which is to be handled by the manipulated adjustment manipulator, in a channel assigned to a channel parameter display region or a channel strip including the manipulated adjustment manipulator is changed (adjusted) to a value according to the current (detected) manipulation.

A layer for assigning channels to each of the channel strip portions 304, 306, and 307 will now be described. Assignment of channels to each channel strip portion is performed by setting layer data in a layer corresponding to the channel strip portion.

One channel strip portion includes a plurality of layers for setting layer data. In this embodiment, one channel strip portion has two layers, a fixed layer and a base layer. Although the term "layer" used herein is conceptual, the layer specifically corresponds to a predetermined region in the current memory. That is, the current memory includes storage regions for layer data corresponding to layers for each channel strip portion. In this embodiment, since one channel strip portion includes two layers, a base layer and a fixed layer, the current memory includes a base layer data region and a fixed layer data region for each channel strip portion. The phrase "to set layer data in a layer" refers to a process for determining one piece of layer data used in one layer of a channel strip portion and particularly refers to a process for storing layer data in a layer data region in the current memory corresponding to the layer of the channel strip portion. "To set" does not involve actual assignment of a channel to a channel strip. "Assignment" will be described later.

One piece of layer data may be set in one layer. A plurality of layer data cannot be simultaneously set in one layer. Setting of layer data is performed independently for each layer. That is, a plurality of layer data may be simultaneously set in one channel strip portion (for example, the channel strip portion 304) by setting layer data in each of a plurality of layers (a fixed layer and a base layer in this example) of the channel strip portion. Layer data to be set in the base layer is referred to as "base layer data" and layer data to be set in the fixed layer is referred to as "fixed layer data". Each of the base layer data and the fixed layer data is data specifying channels to be assigned to the 8 channel strips of the channel strip portion. A piece of base layer data is always set in the base layer. Fixed layer data may not be set in the fixed layer. A plurality of layer data is prepared for each layer for setting. Layer data for setting in a layer may or may not be used for a different layer. For example, base layer data may be set only in a base layer and should not be set in a different layer such as a fixed layer.

Although the base layer data always specifies assignment of channels to all 8 channel strips in the channel strip portion, the fixed layer data may specify assignment of no channels to some channel strips. Examples of the base layer data include base layer data specifying that the input channels 1 to 8 are assigned to the 8 channel strips in order from the left, base layer data specifying that the input channels 9 to 16 are assigned to the 8 channel strips in order from the left, etc. The user may freely compose data specifying assignment of a channel to a channel strip as the fixed layer data. For example, when the user desires to assign vocals to the input channel 22 and to manipulate this channel through the channel strip 1, it is possible to compose fixed layer data specifying that the input channel 22 is assigned to the channel strip 1 and no channels are assigned to the remaining channel strips 2 to 8.

The current memory includes, for each channel strip portion, an assignment channel storage region that stores a channel (assignment channel) that is actually assigned to each channel strip of the channel strip portion. The term "to assign" refers to a process for setting channels that are to be manipulated respectively by the channel strips of the channel strip portion using layer data that has been "set" and specifically refers to a process for determining respective assignment channels (i.e., assignment states of channels) of channel strips based on layer data that has been set in each layer and storing the assignment channels in assignment channel storage regions in the current memory corresponding to the channel strips of the channel strip portion according to the determined assignment states. "Assignment" is performed on all channel strips of the channel strip portion when initial setting is performed as the mixer 100 is powered on or when base layer data or fixed layer data in the current memory corresponding to the channel strip portion has been changed. All layer data set for each layer of the channel strip portion is used for "assignment". If a manipulator of a channel strip is manipulated (or when a software manipulator displayed in a channel parameter display region corresponding to a channel strip is manipulated) after "assignment" is performed such that assignment channels are set in assignment channel storage regions in the current memory, then an assignment channel stored in an assignment channel storage region in the current memory corresponding to the channel strip is set as a channel to be manipulated through the channel strip.

Conceptually, the base layer is located at the bottom hierarchy and the fixed layer is located above the base layer. That is, first, assignment of channels to channel strips is performed based on base layer data that has been set in the base layer. However, when fixed layer data has been set in the fixed layer, the states of assignment of the channels to the channel strips are determined by giving priority to assignment based on the fixed layer data (overwriting assignment based on the base layer data). Here, assignment based on the base layer data as lower layer data is applied to each channel strip to which no channel is assigned according to the fixed layer data as higher layer data. The higher fixed layer is handled as being transparent for channel strips that are not assigned any channels. In the case where base layer data of the base layer has been changed with fixed layer data being set in the fixed layer, the assignment state of each channel strip which is assigned a channel based on the fixed layer data is kept unchanged and the assignment state of each channel strip, which is assigned no channel based on the fixed layer data, is changed based on the changed base layer data.

Specifically, when "assignment" of each channel strip of a channel strip portion is performed, first, base layer data stored in a base layer data region of the channel strip portion in the current memory is copied to an assignment channel storage region in the current memory and then an assignment channel of a channel strip, for which the assignment channel has been specified in fixed layer data stored in a fixed layer data region of the channel strip portion in the current memory, is overwritten to an assignment channel storage region corresponding to the channel strip in the current memory. For a channel strip for which no assignment channel has been specified in the fixed layer data, an assignment channel of the channel strip based on the base layer data is kept unchanged without overwriting the assignment channel stored in the assignment channel storage region. In summary, channel assignment is performed by giving priority to a channel indicated in layer data set in a higher layer over a channel indicated in layer data set in a lower layer.

Reference numeral "311" in FIG. 3 denotes 8 switches for selecting base layer data to be set in a base layer of the channel strip portion 304. These switches are referred to as "base switches" and are respectively referred to as "B1 to B8 switches". Each of the B1 to B8 switches is associated with base layer data. For example, the B1 switch is associated with base layer data 1 specifying that the input channels 1 to 8 are assigned to the 8 channel strips in order from the left and the B2 switch is associated with base layer data 2 specifying that the input channels 9 to 16 are assigned to the 8 channel strips in order from the left. In this case, when the B1 switch is turned on, base layer data specifying that the input channels 1 to 8 are assigned in order from the left, is set in the base layer of the channel strip portion 304. Reference numeral "312" denotes 3 switches for selecting fixed layer data to be set in a fixed layer of the channel strip portion 304. These switches are referred to as "fixed switches" and are respectively referred to as "FIX1 to FIX3 switches". The FIX1 to FIX3 switches are associated with fixed layer data 1 to 3, respectively. For example, when the FIX1 switch is turned on, the fixed layer data 1 is set in the fixed layer of the channel strip portion 304.

Similarly, reference numerals "313" and "314" denote switch sets for selecting base layer data and fixed layer data for the channel strip portion 306. Here, it is assumed that the same selection switches are provided for all channel strip portions although switches for selecting layer data are not shown for the channel strip portion 307.

Figure 4:
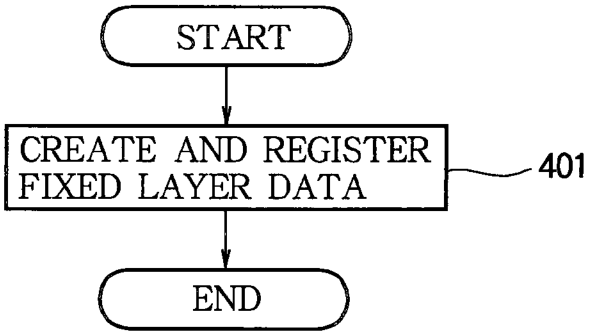
FIG. 4 is a flow chart illustrating a procedure for creating a fixed layer.

FIG. 4 is a flow chart illustrating a procedure for creating fixed layer data by the CPU 101. When the user performs a specific manipulation through the manipulator 106, the CPU 101 proceeds to a fixed layer data creation screen (mode) and activates this procedure. In step 401, based on an instruction from the user, the CPU 101 performs a process for creating fixed layer data and registering the fixed layer data in a specific storage region. As described above, although one piece of fixed layer data specifies assignment of channels to 8 channel strips in one channel strip portion, the fixed layer data may also specify assignment of no channels to some channel strips. It is possible to register a plurality of fixed layer data independently of each other. However, since three fixed switches (see "312" and "314" in FIG. 3) are provided for each channel strip portion in this example, it is possible to register three pieces of fixed layer data per channel strip portion in association with the fixed switches. That is, when created fixed layer data is registered, the created fixed layer data is stored in a predetermined storage region such that it is possible to specify which fixed switch of which channel strip portion corresponds to the fixed layer data. On the other hand, when a fixed switch has been manipulated, a channel strip portion and fixed layer data corresponding to the fixed switch are specified.

Figure 5:
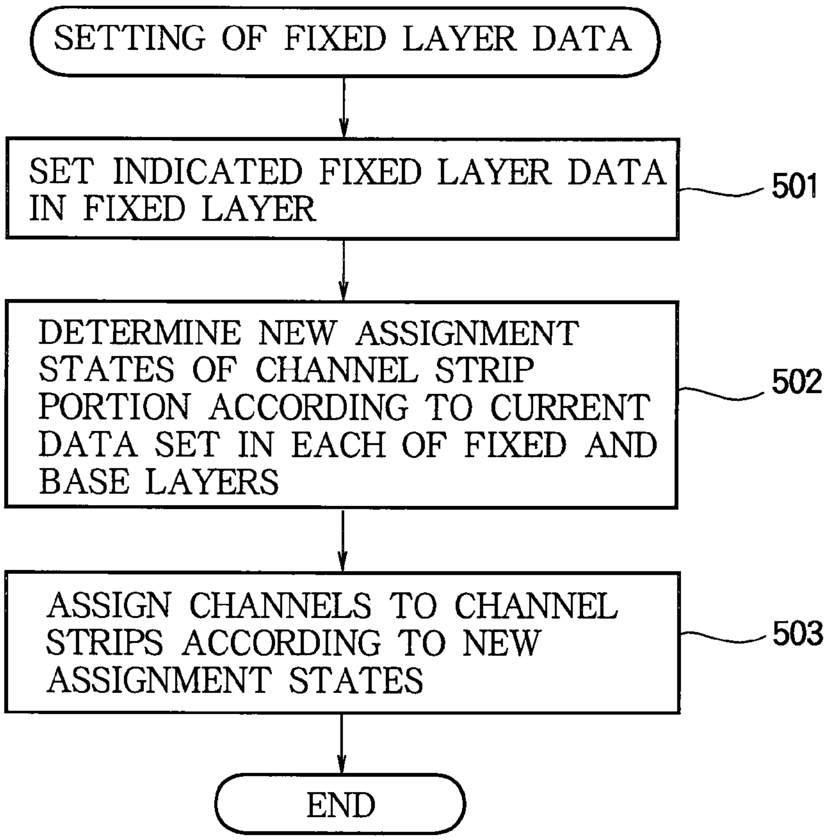
FIG. 5 is a flow chart illustrating a procedure for setting fixed layer data.

FIG. 5 is a flow chart illustrating a procedure for setting fixed layer data by the CPU 101. This procedure is activated when a fixed switch has been manipulated (i.e., when an instruction to set new fixed layer data has been detected). When a fixed switch is manipulated, fixed layer data and a channel strip portion corresponding to the manipulated fixed switch are specified and corresponding information is applied to this procedure.

In step 501, the specified fixed layer data is set in a fixed layer of the specified channel strip portion. That is, the fixed layer data is written as current data to a fixed layer data region of the channel strip portion in the current memory. In step 501, in the case where different fixed layer data has already been set in the fixed layer data region, the different fixed layer data is overwritten with the specified fixed layer data, i.e., the different fixed layer data is deleted from the fixed layer data region and the specified fixed layer data is set as new fixed layer data in the fixed layer data region. Here, current data set in the base layer is not affected. That is, when current data of one layer is rewritten, current data of another layer is kept unchanged without being rewritten.

In step 502, new assignment states of the channel strip portion are determined according to the current data set in each of the base layer data region and the fixed layer data region of the channel strip portion in the current memory. The current data set in the fixed layer data region is the data that has been rewritten in step 501. Base layer data is always set as current data in the base layer data region. In step 503, a channel is assigned to each channel strip according to the new assignment states. "Assignment" has already been described above. In the case where the assignment states of the channel strip portion 304 have been changed, display of the region 302 is also updated according to the new assignment channels.

Figure 6:
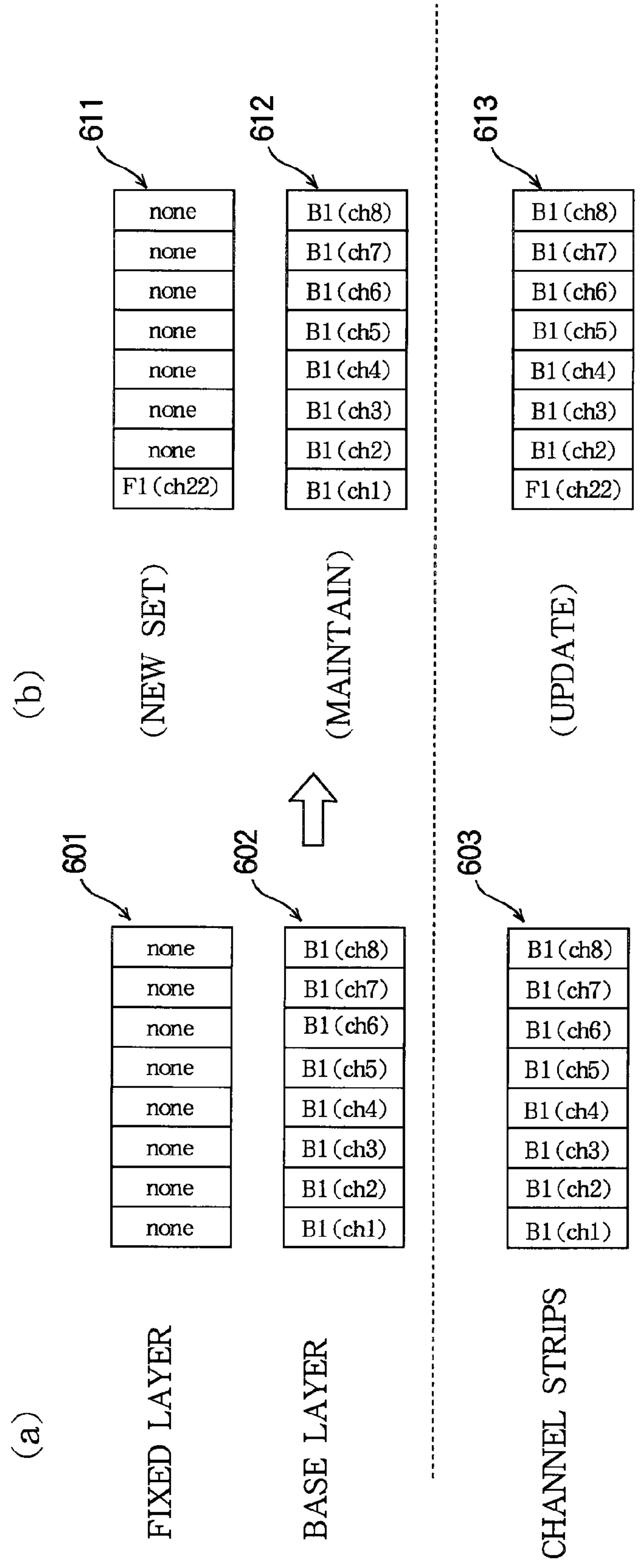
FIG. 6 illustrates exemplary setting of a fixed layer.

FIG. 6 illustrates exemplary setting of fixed layer data for an indicated (or specified) channel strip portion through the procedure of FIG. 5. Reference numeral "601" denotes data (current data) set in a fixed layer data region for the channel strip portion in the current memory, and reference numeral "602" denotes data (current data) set in a base layer data region for the channel strip portion in the current memory. Base layer data of the B1 switch is set in the current data 602 of the base layer. Fixed layer data has not been set in the current data 601 of the fixed layer. Reference numeral "603" denotes data (current data) set in assignment channel storage regions in the current memory when assignment has been performed based on the current data 602 and 603 of the base layer and the fixed layer. Channel assignment states are determined based only on the base layer data since fixed layer data has not been set, and the input channels 1 to 8 are assigned to the 8 channel strips which are referred to as "channel strips 1 to 8" in order from the left.

Here, let us assume that, in the state of FIG. 6(*a*), the procedure of FIG. 5 has been performed by turning the FIX1 switch on to set new fixed layer data. FIG. 6(*b*) illustrates the resulting state. Reference numeral "611" denotes current data of the fixed layer data region that has been newly set through step 501 of FIG. 5. The set fixed layer data is data specifying that the input channel 22 is assigned to the channel strip 1 and no channels are assigned to the other channel strips 2 to 8. Current data 612 of the base layer is kept unchanged from the current data 602 without being rewritten. "613" denotes current data of the assignment channel storage region in the current memory when assignment has been performed according to the assignment states determined based on the current data 612 and 611 of the base layer and the fixed layer through steps 502 and 503 of FIG. 5. In this assignment process, assignment is performed based on fixed layer data for a channel strip (i.e., the leftmost channel strip 1) to which a channel has been specified to be assigned in the fixed layer since priority is given to assignment based on current data of the fixed layer which is the higher layer. Here, indications of layer data of a layer immediately below the higher layer are used for channel strips (i.e., the channel strips 2 to 8 other than the channel strip 1) to which channels have not been specified to be assigned in the layer data of the higher layer. That is, channels that have been indicated to be assigned in the base layer data recorded as current data of the base layer are assigned. Thus, the assignment states become such that the input channel 22 is assigned to the channel strip 1 and the channels that have been specified in the base layer data are assigned to the channel strips 2 to 8.

Here, it is also assumed that it is not only possible to set new layer data in a layer (the fixed layer in this example) other than the bottom layer but also to clear the layer data set in the layer. When a clear instruction has been issued, the current data corresponding to the layer becomes empty (i.e., becomes an initial state) as indicated by "601" in FIG. 6.

Figure 7:
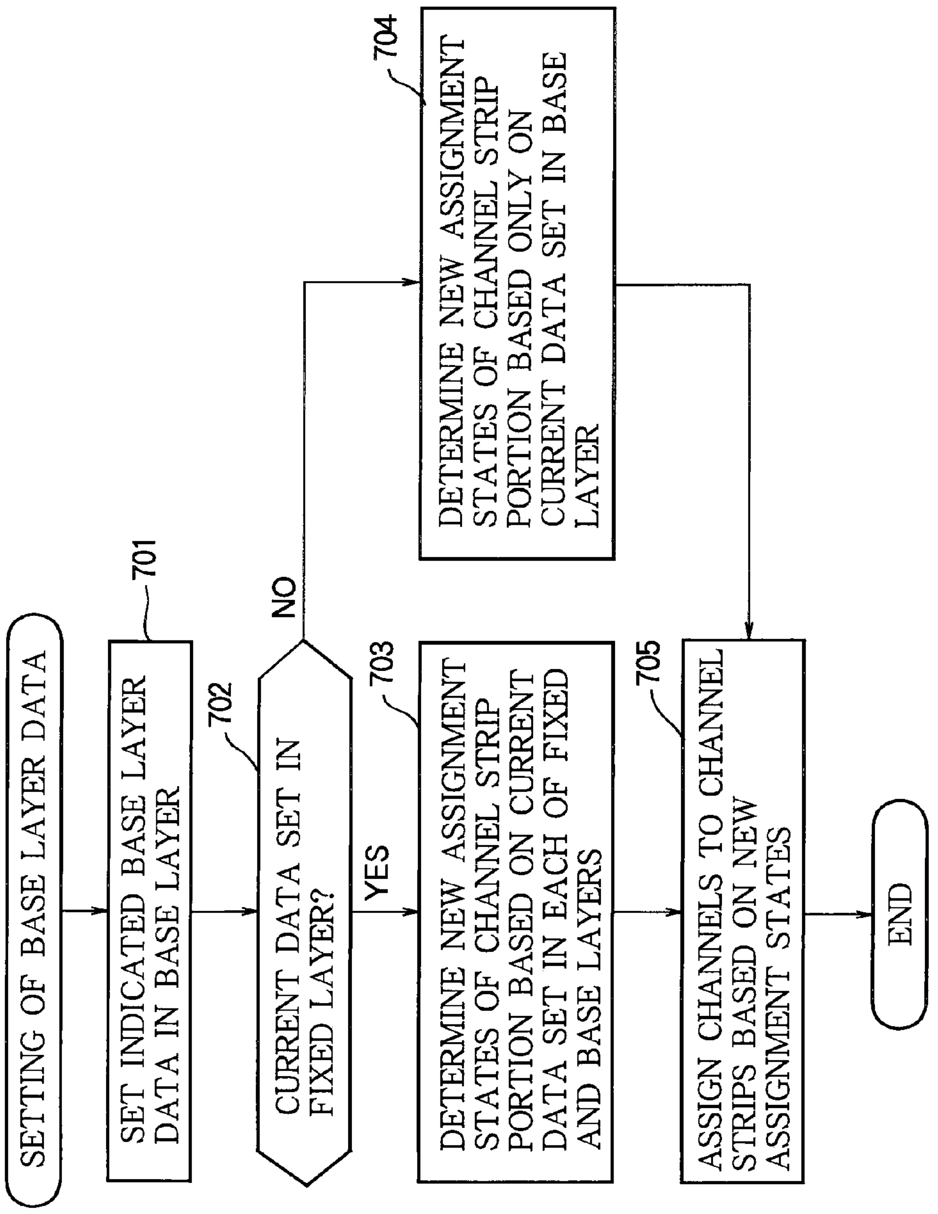
FIG. 7 is a flow chart illustrating a procedure for setting base layer data.

FIG. 7 is a flow chart illustrating a procedure for setting base layer data by the CPU 101. This procedure is activated when a base switch has been manipulated (i.e., when an instruction to set new base layer data has been detected). When a base switch is manipulated, base layer data and a channel strip portion corresponding to the manipulated base switch are specified and corresponding information is applied to this procedure.

In step 701, the specified base layer data is set in a base layer of the specified channel strip portion. That is, the base layer data is written as current data to a base layer data region of the channel strip portion in the current memory. In step 701, in the case where different base layer data has already been set in the base layer data region, the specified base layer data is set in the base layer data region, overwriting the different base layer data. Here, current data set in the fixed layer is not affected.

Whether or not current data has been set in the fixed layer data region of the channel strip portion in the current memory is determined in step 702. Upon determining that current data has been set in the fixed layer data region, in step 703, new assignment states of the channel strip portion are determined according to the current data set in each of the fixed layer data region and the base layer data region of the channel strip portion in the current memory. Next, in step 705, a channel is assigned to each channel strip according to the new assignment states. "Assignment" has already been described above. In the case where the assignment states of the channel strip portion 304 have been changed, display of the region 302 is also updated according to the new assignment channels. Upon determining in step 702 that current data has not been set in the fixed layer data region, in step 704, the CPU 101 determines new assignment states of the channel strip portion based only on current data set in the base layer data region and then proceeds to step 705.

Figure 8:
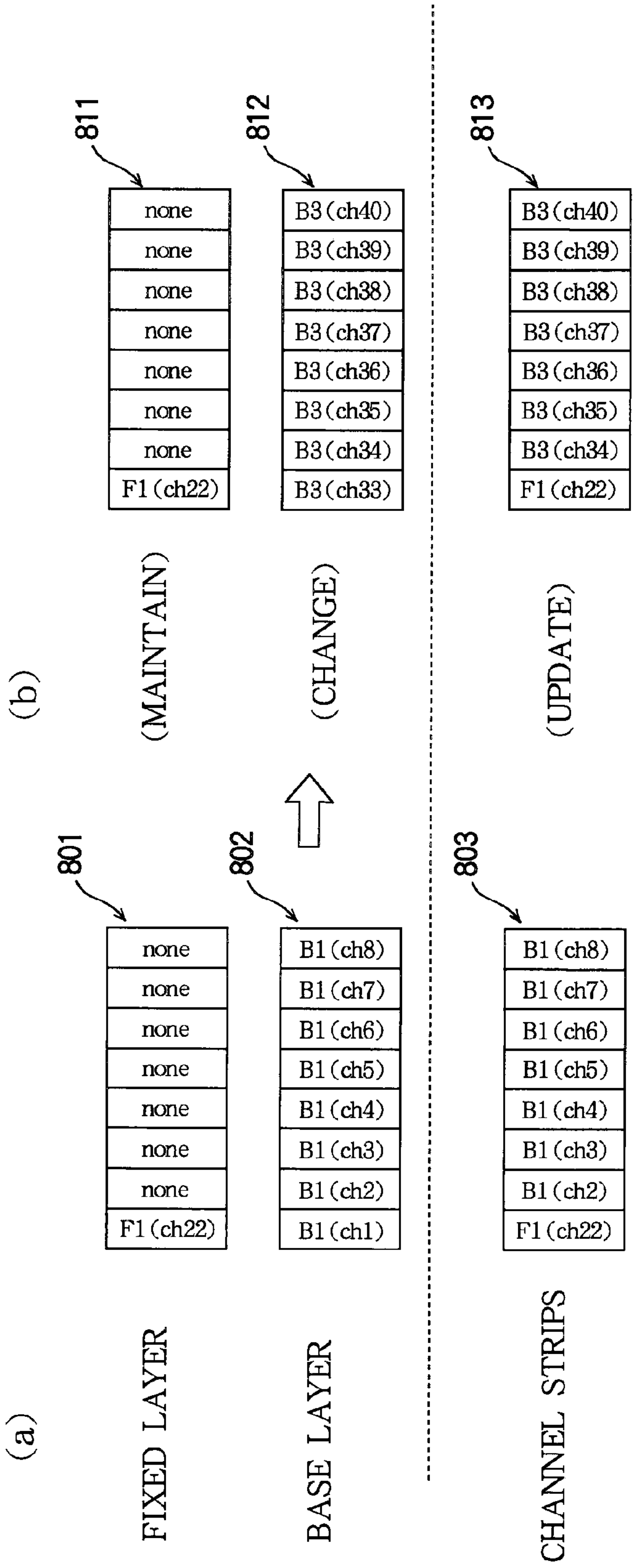
FIG. 8 illustrates exemplary base layer change.

FIG. 8 illustrates an example in which a base layer of an indicated (or specified) channel strip portion is changed through the procedure of FIG. 7 in the state in which fixed layer data has been set in a fixed layer of the indicated channel strip portion. Reference numeral "801" denotes data (current data) set in a fixed layer data region for the channel strip portion in the current memory and reference numeral "802" denotes data (current data) set in a base layer data region for the channel strip portion in the current memory. Base layer data of the B1 switch is set in the current data 802 of the base layer. Fixed layer data specifying that the input channel 22 is assigned to the channel strip 1 and no channels are assigned to the channel strips 2 to 8 has been set in the current data 801 of the fixed layer. Reference numeral "803" denotes data (current data) set in assignment channel storage regions in the current memory when assignment has been performed based on the current data 802 and 801 of the base layer and the fixed layer. The input channel 22 specified in the fixed layer data is assigned to the channel strip 1 and the channels specified in the base layer data are assigned to the channel strips 2 to 8.

Here, let us assume that, in the state of FIG. 8(*a*), the procedure of FIG. 7 has been performed by turning the B3 switch on to change base layer data. FIG. 8(*b*) illustrates the resulting state. Reference numeral "812" denotes current data of the base layer data region that has been changed through step 701 of FIG. 7. The newly set base layer data is data specifying that the input channels 33 to 40 are assigned to the channel strips 1 to 8. Current data 811 of the fixed layer is kept unchanged from the current data 801 without being rewritten. Reference numeral "813" denotes current data of the assignment channel storage region in the current memory when assignment has been performed according to the assignment states determined based on the current data 812 and 811 of the base layer and the fixed layer through the processes of steps 702->703->705 of FIG. 7. The input channel 22 specified in the fixed layer data is assigned to the channel strip 1 and the channels specified in the base layer data are assigned to the channel strips 2 to 8. Thus, it is possible to switch assignment of the base layer while fixedly using assignment of the fixed layer.

In addition, since the base layer is the bottom layer, current data of the layer cannot be empty and thus there is no process for clearing the current data of the layer. Base layer data has always been recorded as current data in the base layer data region.

In addition, fixed layer data may not be prepared in advance and a selected channel, i.e., a channel assigned to a channel strip on which a selection (SEL) switch (which is provided on each channel strip) has been manipulated, may be determined to be a channel specified in the fixed layer and thus the channel may be set as current data in a fixed layer data region in the current memory. In this case, the fixed switches on the manipulation panel are unnecessary and instead, for example, a switch or the like for issuing an instruction to switch on or off a mode for setting the fixed layer is provided on the manipulation panel.

A second embodiment of the above mode of the invention will now be described with reference to FIGS. 9 to 12.

Figure 9:
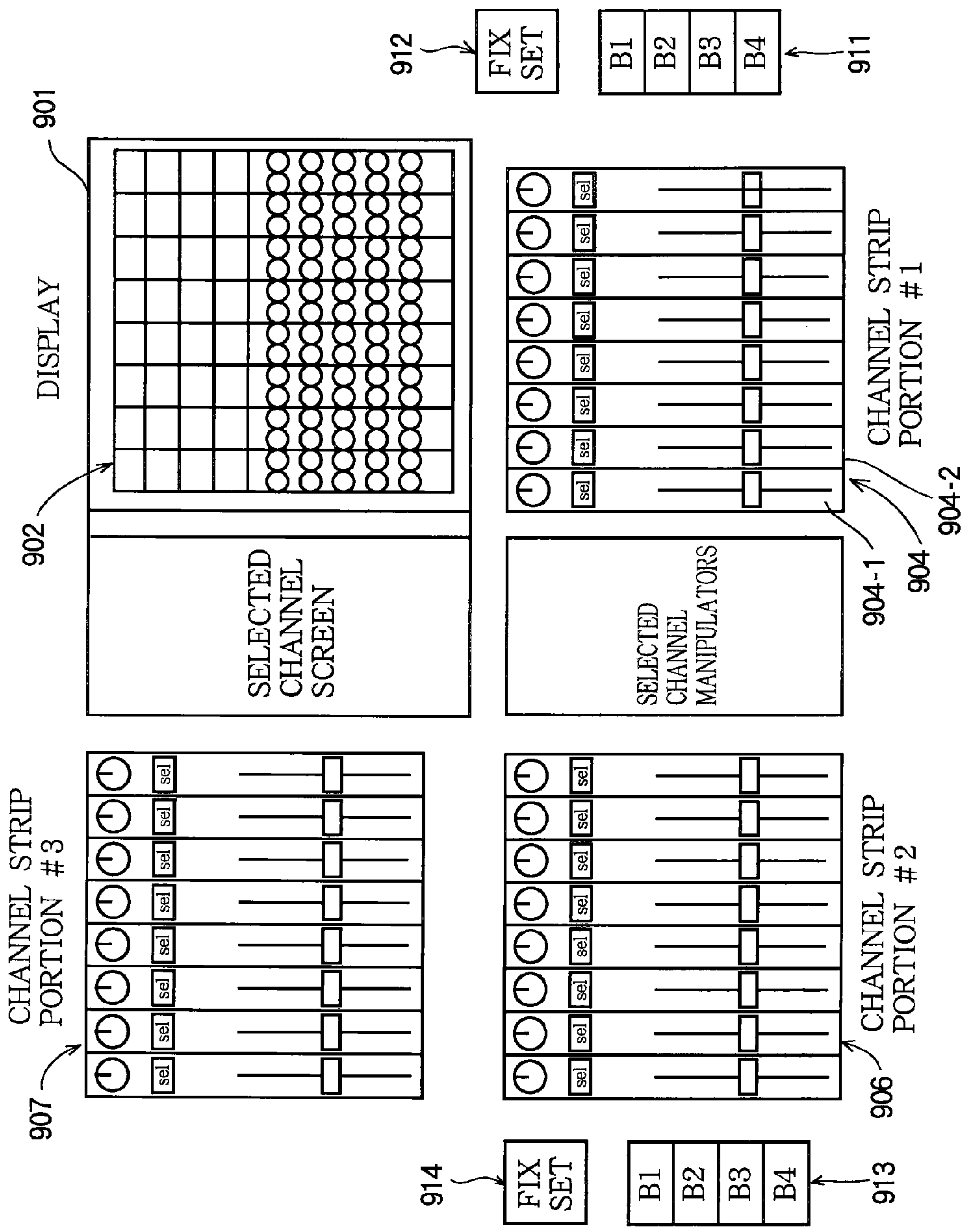
FIG. 9 illustrates an external appearance of a manipulation panel of a digital mixer according to a second embodiment of the invention.

FIG. 9 illustrates an external appearance of a manipulation panel of a digital mixer of the second embodiment. In the second embodiment, fixed layer data is not prepared in advance and an assignment channel assigned to a channel strip whose SEL switch has been manipulated is set as a channel specified in a fixed layer. The hardware configuration of the digital mixer of the second embodiment is similar to that of FIG. 1 and a block configuration for mixing processing is also similar to that of FIG. 2.

The components of the manipulation panel of FIG. 9 are similar to those of FIG. 3 and descriptions of reference numerals 901, 902, 904, 906, 907, 911, and 913 will be omitted since they correspond to 301, 302, 304, 306, 307, 311, and 313. Although not explained in the description of the first embodiment, a SEL switch is provided on each channel strip of each of the channel strip portions 304, 306, 307, 904, 906, and 907 (at a position below the rotary encoder in FIG. 3 and FIG. 9). In addition, while a plurality of fixed switches 312 and 314 is provided in the first embodiment, fixed set switches 912 and 914 for issuing an instruction to turn on or off a mode for setting a fixed layer (referred to as a "fixed set mode") are provided in the second embodiment. For example, when the user desires to locate the input channel 16 in the fixed layer in the channel strip portion 904, first, the user turns on the B2 switch in the base switch 911 to set the input channels 9 to 16 in the base layer with the fixed layer having been cleared. Then, the user depresses the fixed switch 912 to turn the fixed set mode on and then turns on the SEL switch of the channel strip 8 in the fixed set mode. This corresponds to an instruction to set a channel currently assigned to the channel strip 8 in the fixed layer. Since the input channel 16 has been assigned to the channel strip 8, the input channel 16 is assigned to the fixed layer.

A channel strip to which an input channel is assigned in the fixed layer may be predetermined and may also be selected by the user. Here, it is assumed that input channels are assigned to the eight channel strips 1 to 8 in the fixed layer from the left. Accordingly, in this example, the input channel 16 is assigned to the channel strip 1. In the case where SEL switches of a plurality of channel strips have been depressed in this fixed set mode, channels are sequentially assigned to the subsequent channel strips 2, 3, . . . . Channel strips whose SEL switches are turned on are not limited to channel strips in a channel strip portion whose fixed set mode has been turned on and such assignment may also be performed by turning on SEL switches of channel strips in another channel strip portion.

Then, the fixed set switch 912 is again depressed to turn the fixed set mode off. Thereafter, the input channel 16 continues to be assigned to the channel strip 1 even when the base layer is switched. When the user desires to cancel assignment of the channel strip 1 in the fixed layer, the user may turn off the SEL switch of the channel strip 8 while the fixed set mode is on. Here, it is assumed that an LED embedded in the switch has been turned on to indicate that the switch is on. In this case, it is assumed that, when assignments to the channel strips 2, 3, . . . of the fixed layer are present, the assignments are aligned to the left such that the assignments are changed to assignments to the channel strips 1, 2, . . . .

Figure 10:
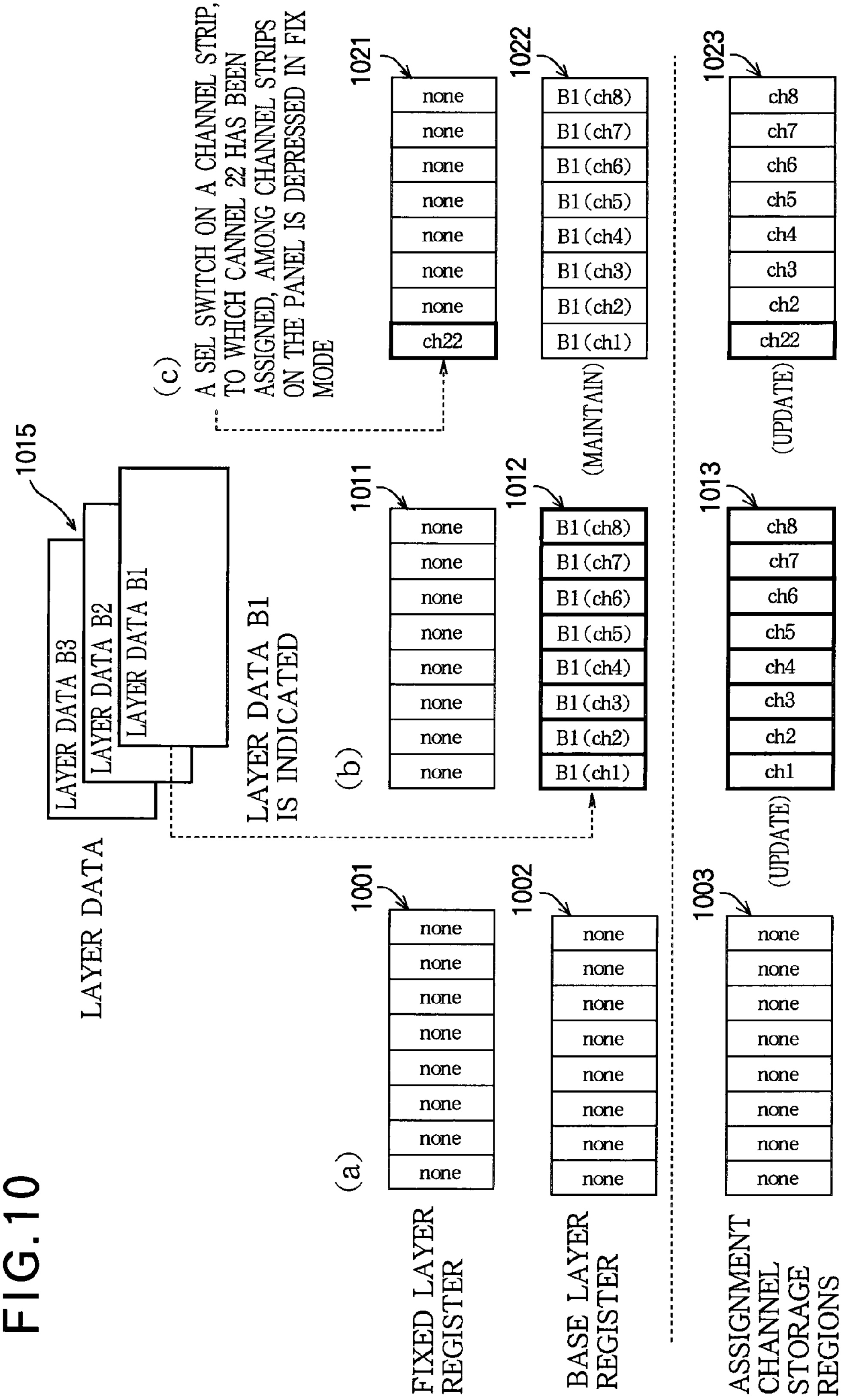
FIG. 10 illustrates exemplary layer setting according to the second embodiment.

FIG. 10 illustrates exemplary layer setting in the second embodiment. While the fixed layer data region and the base layer data region are provided in the current memory, for example, as shown in FIG. 6 or FIG. 8 in the first embodiment, only assignment channel storage regions are provided in the current memory and a fixed layer data region and a base layer data region are not provided in the current memory in the second embodiment. Instead, a fixed layer register and a base layer register are provided as work registers. It is also possible to employ a configuration in which data regions corresponding to the fixed layer register and the base layer register of the second embodiment are provided in the current memory.

The base layer in the second embodiment is a layer for assigning channels to channel strips using layer data, similar to the base layer of the first embodiment. The base layer register is provided for each channel strip portion and includes regions for storing channels to be respectively assigned to 8 channel strips in a base layer of the channel strip portion. When a base switch has been depressed, base layer data corresponding to the base switch is set in the base layer register. In addition, it is assumed that one piece of layer data can be set in the base layer register and one of a plurality of prepared base layer data is selected and set in the base layer register using the base switch. A piece of base layer data is always set in the base layer register and the base layer register has no state in which no base layer data is set in the base layer register (except when the base layer register is in an initial state). The same number of channels as all 8 channel strips are always set in the base layer register. There is no channel strip in which no channel is set in the base layer.

Layer data is not used in the fixed layer of the second embodiment although the fixed layer is a layer in which a channel specified by the user can be assigned, similar to the fixed layer of the first embodiment. Here, it is assumed that the user specifies a channel, which they desire to assign in the fixed layer, for each individual channel strip. Accordingly, fixed layer data is not present in the second embodiment. The fixed layer register is provided for each channel strip portion and includes regions for storing channels to be respectively assigned to 8 channel strips in a fixed layer of the channel strip portion. There is no need to set the same number of channels as all channel strips in the fixed layer register and there may be a channel strip in which no channel is set. The fixed layer register may also have a state in which none of the channel strips is assigned a channel.

Reference numeral "1001" in FIG. 10(*a*) denotes data set in the fixed layer register of the channel strip portion and reference numeral "1002" denotes data set in the base layer register of the channel strip portion. Reference numeral "1003" denotes data (current data) of the channel strip portion stored in assignment channel storage regions in the current memory. FIG. 10(*a*) illustrates an initial state in which no data has been set in the fixed layer register 1001 and the base layer register 1002 and all channel strips are set to "none". Accordingly, all channel strips are set to "none" in the assignment channel storage regions 1003.

Here, let us assume that, in the state of FIG. 10(*a*), the B1 switch in the base switch 911 has been turned on to set new base layer data. FIG. 10(*b*) illustrates the resulting state. Reference numeral "1015" denotes base layer data that has been prepared in advance in association with each base switch. Base layer data B1 corresponding to the B1 switch that has been turned on is set in a base layer register as indicated by "1012". The state of the fixed layer register is not changed as indicated by "1011". Assignment states of the channel strip portion are determined based on the settings 1011 and 1012 of the layer registers, and channels are assigned to the channel strips of the channel strip portion according to the determined assignment states. Reference numeral "1013" denotes current data of the channel strip portion in assignment channel storage regions in the current memory in this state, which stores channels assigned to the channel strips according to the determined assignment states. In this example, the base layer data directly becomes the current data of the assignment channel storage regions since data is not present in the fixed layer register as indicated by "1011".

Here, let us assume that, in the state of FIG. 10(*b*), the fixed set switch 912 is depressed to turn the fixed set mode on and then a SEL switch is depressed on a channel strip to which the channel 22 has been assigned among channel strips on the panel surface. This allows the channel 22 to be set in a region corresponding to the leftmost channel strip 1 in the fixed layer register as indicated by "1021" in FIG. 10(*c*). The state of the base layer register is not changed as indicated by "1022". Then, assignment states of the channel strip portion are determined based on the settings 1021 and 1022 of the layer registers and channels are assigned to the channel strips according to the determined assignment states. Reference numeral "1023" denotes current data of the channel strip portion in assignment channel storage regions in the current memory, which stores channels assigned to the channel strips according to the determined assignment states. In this example, since data is present in the fixed layer register as indicated by "1021", assignment based on the setting of the fixed layer register is given priority and therefore such assignment is performed for a channel strip (i.e., the channel strip 1) in which a channel has been specified in the fixed layer. Channels specified in the base layer register directly below the fixed layer are assigned to channel strips (i.e., the channel strips 2 to 8) in which no channels are specified in the fixed layer register.

Figure 11:
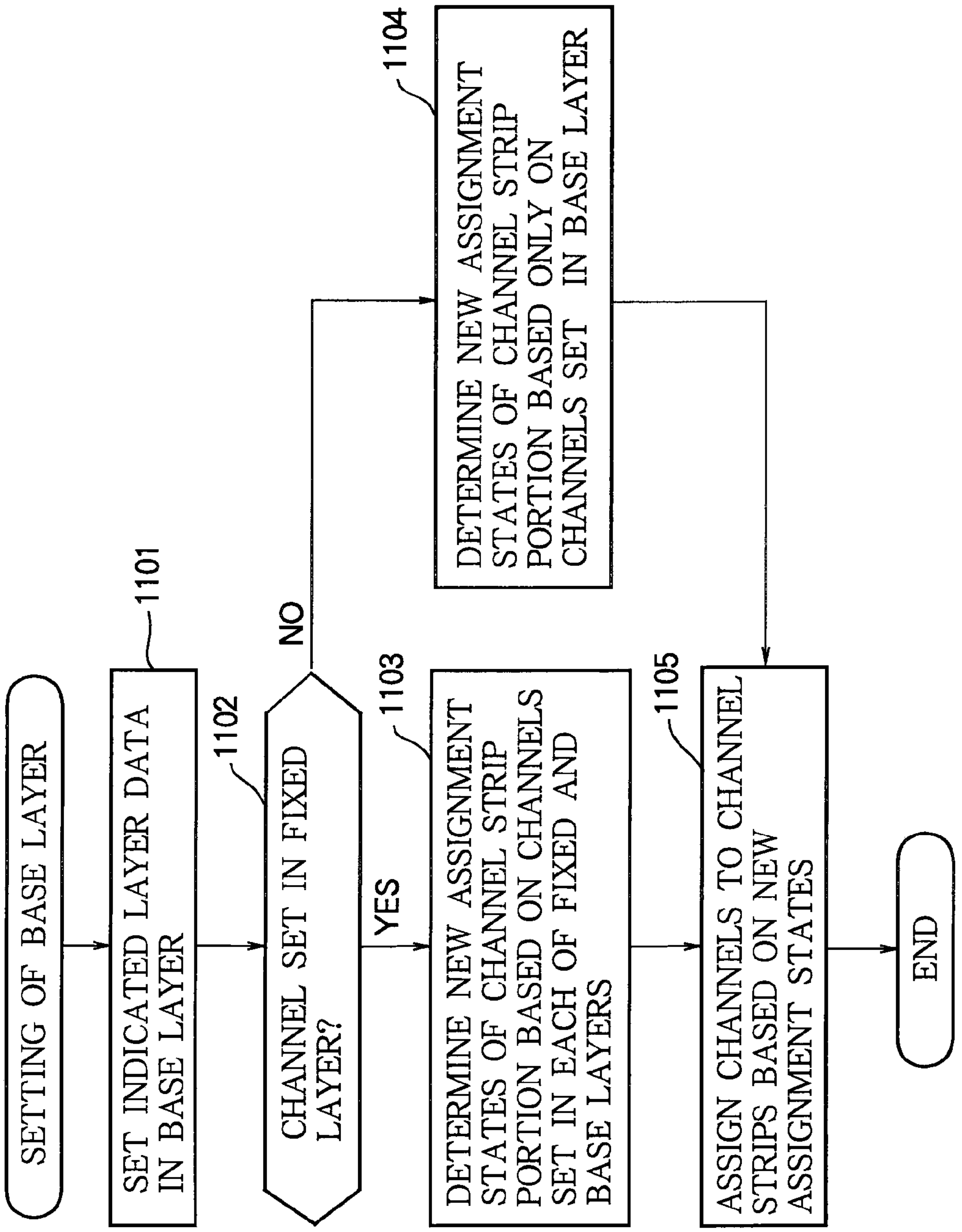
FIG. 11 is a flow chart illustrating a procedure for setting a base layer according to the second embodiment.

FIG. 11 is a flow chart illustrating a procedure for setting base layer data by the CPU 101. This procedure is activated when a base switch has been manipulated (i.e., when an instruction to set new base layer data has been detected). When a base switch is manipulated, base layer data and a channel strip portion corresponding to the manipulated base switch are specified and corresponding information is applied to this procedure.

In step 1101, the specified base layer data is set in a base layer of the specified channel strip portion. That is, the base layer data is written to a base layer register of the channel strip portion (for example, see "1002"->"1012" of FIG. 10). In step 1101, in the case where different base layer data has already been set in the base layer register, the specified base layer data is set in the base layer register, overwriting the different base layer data. Here, data set in the fixed layer register is not affected (see "1001"->"1011" in FIG. 10).

Whether or not data has been set in the fixed layer register of the channel strip portion is determined in step 1102. Upon determining that data has been set in the fixed layer register (corresponding to the state of FIG. 10(*c*)), in step 1103, new assignment states of the channel strip portion are determined according to the data set in each of the fixed layer register and the base layer register of the channel strip portion. Next, in step 1105, a channel is assigned to each channel strip according to the new assignment states. Determination of assignment states and assignment of channels have already been described above. In the case where the assignment states of the channel strip portion 904 have been changed, display of the region 902 is also updated according to the new assignment channels. Upon determining in step 1102 that data has not been set in the fixed layer register (corresponding to the case of FIG. 10(*b*)), in step 1104, the CPU 101 determines new assignment states of the channel strip portion based only on data set in the base layer register and then proceeds to step 1105.

Figure 12:
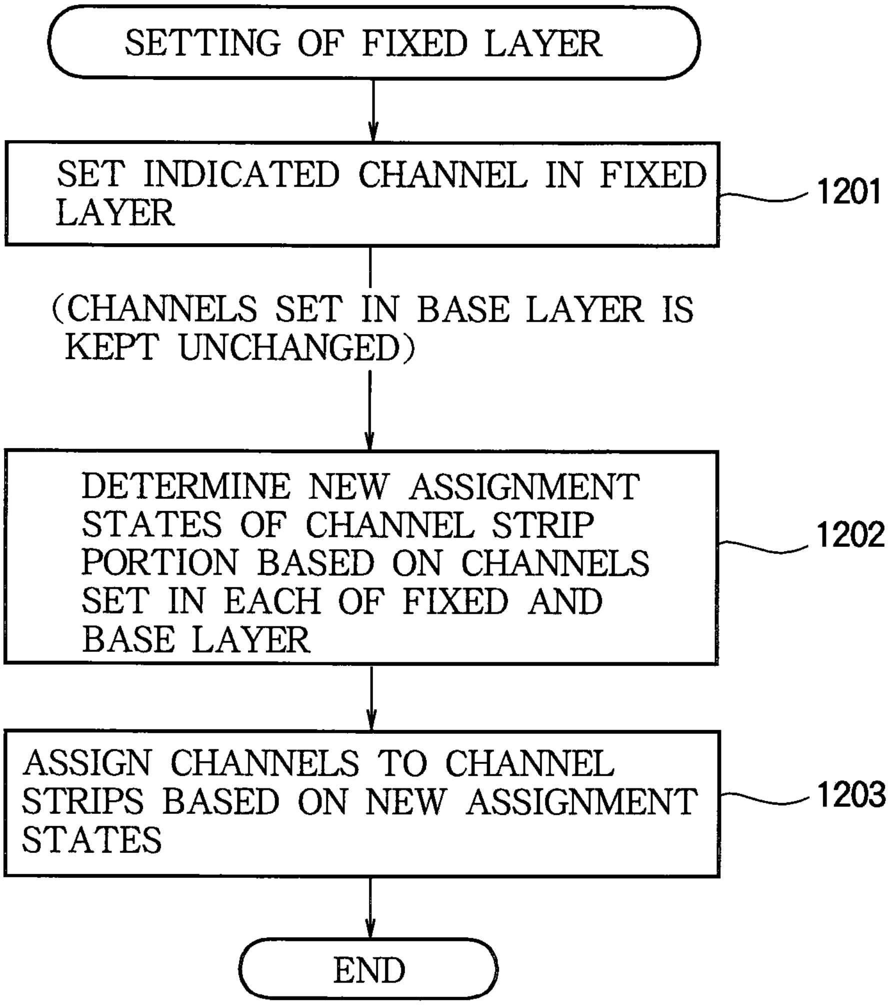
FIG. 12 is a flow chart illustrating a procedure for setting a fixed layer according to the second embodiment.

FIG. 12 is a flow chart illustrating a procedure for setting a fixed layer by the CPU 101. A fixed set switch is manipulated to turn a fixed set mode on. Then, this procedure is activated when a SEL switch in a channel strip is turned on in the fixed set mode (i.e., when an instruction to set a new channel to a fixed layer has been detected). A channel strip portion corresponding to the manipulated fixed set switch is specified and a channel corresponding to the SEL switch that has been turned on (i.e., a channel assigned to a channel strip including the SEL switch turned on) is specified, and corresponding information is applied to this procedure.

In step 1201, the indicated (specified) channel is set in the fixed layer register of the indicated channel strip portion (for example, see "1011"->"1021" in FIG. 10). In this embodiment, channels are assigned to channel strips sequentially from the leftmost channel strip in the fixed layer register. Accordingly, first, whether or not the leftmost assignment channel setting region in the fixed layer register is empty (i.e., whether or not the state of the leftmost assignment channel setting region is "none") is checked. Then, when the leftmost assignment channel setting region is empty, the indicated channel is set in the leftmost assignment channel setting region. When the leftmost assignment channel setting region is not empty, assignment channel setting regions at the right side are sequentially checked to search for an empty region and the indicated channel is then set in the empty region. Here, data set in the base layer register is not affected (see "1012"->"1022" in FIG. 10).

In step 1202, new assignment states of the channel strip portion are determined according to the data set in each of the fixed layer register and the base layer register of the channel strip portion. The data set in the fixed layer register is the data that has been rewritten in step 1201. Base layer data is always set in the base layer register. In step 1203, a channel is assigned to each channel strip according to the new assignment states. That is, as in the case of FIG. 10(*c*), assignment states are determined based on the data set in the fixed layer register 1021 and the base layer register 1022, and channels assigned to the channel strips according to the determined assignment states are stored in assignment channel storage regions 1023. Determination of assignment states and assignment of channels have already been described above. In the case where the assignment states of the channel strip portion 904 have been changed, display of the region 902 is also updated according to the new assignment channels.

Although the first and second embodiments have been described with reference to two layers as an example, the number of layers may also be three or more. In the case where the number of layers is three or more, the bottom layer may be defined as the same as the base layer of the above embodiments, a layer above the bottom layer may be defined as the same as the fixed layer of the above embodiments, and higher priority may be given to a higher layer.

Although, for example, as indicated by "601" in FIG. 6, the first and second embodiments have been described with reference to the "state in which fixed layer data has not been set in the fixed layer", it is, of course, possible that fixed layer data specifying that no channels are assigned to all channel strips is prepared and, when the fixed layer data has been set, this setting is handled in the same way as the "state in which fixed layer data has not been set in the fixed layer".

Although assignment channel storage regions are provided in the current memory in the first and second embodiments, the storage regions are not necessarily provided. Channels for assignment to channel strips may also be determined directly based on fixed layer data and base layer data that have been set each time there is a need to specify channels for assignment to channel strips.

In the first and second embodiments, each of the fixed layer data and base layer data sets channels for a given number of channel strips (eight channel strips in the disclosed embodiments). The invention is not limited to the disclosed embodiments. Each of the fixed layer data and base layer data may set one channel for one channel strip.

What is claimed is:

1. An audio signal processing apparatus for performing audio signal process composed of a plurality of channels each having parameters used in the audio signal process, the audio signal processing apparatus comprising:

a plurality of channel strips, each channel strip being assigned with a channel and being provided with manipulators for adjusting values of the parameters of the assigned channel;

a plurality of storing sections, each storing section being capable of storing a respective setting indicative of one or more channels for one or more of the channel strips; and an assigning section that, for an assignment of a channel to one channel strip of the plurality of channel strips, refers to a plurality among the storing sections and assigns a channel to said one channel strip according to the setting stored in one of the storing sections referred to by the assigning section.

2. The audio signal processing apparatus according to claim 1, wherein each of the storing sections is capable of storing its respective setting for a given number of channel strips, and one of the storing sections stores its respective setting for all of the given number of channel strips, while another of the storing sections is allowed to store its respective setting for only a part of the given number of the channel strips.

3. The audio signal processing apparatus according to claim 1, wherein the plurality of channel strips include a group of channel strips, wherein one of the storing sections stores its respective setting indicative of channels set to the group of channel strips, and wherein another of the storing sections stores its respective setting indicative of channels set to the same group of channel strips as the group involved in the setting stored in the one storing section.

4. The audio signal processing apparatus according to claim 1, comprising:

a changing section that changes the setting stored in one of the storing sections and maintains the setting stored in a remaining storing section without changing the setting in the remaining storing section.

5. The audio signal processing apparatus according to claim 1, wherein the plurality of storing sections have different priorities relative to each other, and wherein the assigning section assigns the channel to said one channel strip according to the setting stored in the storing section having the highest priority among all of the storing sections referred to by the assigning section.

6. The audio signal processing apparatus according to claim 5, comprising:

a changing section, wherein the plurality of storing sections comprise a first storing section and a second storing section having a priority higher than the first storing section, the first storing section storing a first setting indicative of channels set to a group of channel strips, the second storing section storing a second setting indicative of one or more channels set to the same group of channel strips as the group involved in the first setting, wherein the audio signal processing apparatus further comprises a first specifying section that is capable of designating the first storing section and specifying one or more channels to be set to the group of channel strips, wherein the changing section changes the first setting stored in the first storing section when the same is designated by the first specifying section so as to reflect the specified one or more channels in the changed first setting, and wherein the assigning section sorts the group of channel strips into a first part composed of one or more channel strips not involved in the second setting and a second part composed of one or more channel strips involved in the second setting, such that the assigning section assigns one or more channels to the second part of channel strips according to the second setting and assigns one or more channels to the first part of channel strips according to the changed first setting.

7. The audio signal processing apparatus according to claim 5, comprising:

a changing section, wherein the plurality of storing sections comprise a first storing section and a second storing section having a priority higher than the first storing section, the first storing section storing a first setting indicative of channels set to a group of channel strips, the second storing section storing a second setting indicative of one or more channels set to the same group of channel strips as the group involved in the first setting, wherein the audio signal processing apparatus further comprises a second specifying section that is capable of designating the second storing section and specifying one or more channels to be set to the group of channel strips, wherein the changing section changes the second setting stored in the second storing section when the same is designated by the second specifying section so as to reflect the specified one or more channels in the changed second setting, wherein the assigning section sorts the group of channel strips into a first part composed of one or more channel strips not involved in the second setting and a second part composed of one or more channel strips involved in the second setting, such that the assigning section assigns one or more channels to the second part of channel strips according to the changed second setting and assigns one or more channels to the first group of channel strips according to the first setting.

8. The audio signal processing apparatus according to claim 1, comprising:

a changing section, wherein the assigning section refers to the plurality among the storing sections and assigns the channel to said one channel strip, after the setting stored in one of the plurality among the storing sections is changed by the changing section.

* * * * *